US012685250B2

(12) United States Patent
Van Santen et al.

(10) Patent No.: US 12,685,250 B2
(45) Date of Patent: Jul. 21, 2026

(54) DEVICE FOR DILUTING AND MIXING CONCENTRATED AQUEOUS SOLUTIONS

(71) Applicant: Yara International ASA, Oslo (NO)

(72) Inventors: Wouter Van Santen, Kortgene (NL); Wilson Shinji Goto, Oslo (NO)

(73) Assignee: YARA INTERNATIONAL ASA, Oslo (NO)

( * ) Notice: Subject to any disclaimer, the term of this patent is extended or adjusted under 35 U.S.C. 154(b) by 72 days.

(21) Appl. No.: 18/865,065

(22) PCT Filed: May 19, 2023

(86) PCT No.: PCT/EP2023/063453
§ 371 (c)(1),
(2) Date: Nov. 12, 2024

(87) PCT Pub. No.: WO2023/222864
PCT Pub. Date: Nov. 23, 2023

(65) Prior Publication Data
US 2025/0311661 A1      Oct. 9, 2025

(30) Foreign Application Priority Data
May 19, 2022    (EP) ..................................... 22174249

(51) Int. Cl.
*A01C 23/04*            (2006.01)
(52) U.S. Cl.
CPC .................................. *A01C 23/042* (2013.01)

(58) Field of Classification Search
CPC .. A01C 23/042; B01F 21/22; B01F 25/31241; B01F 25/316; B01F 25/32; B01F 33/813; B01F 35/1453
See application file for complete search history.

(56) References Cited

U.S. PATENT DOCUMENTS

| | | | | |
|---|---|---|---|---|
| 3,913,606 A | * | 10/1975 | Anderson, Jr. ...... | A01C 23/042 |
| | | | | 137/563 |
| 4,382,552 A | * | 5/1983 | Lubsen ............. | B01F 25/31231 |
| | | | | 239/317 |
| 10,368,482 B1 | * | 8/2019 | Cooper ................ | A01C 23/042 |
| 10,584,045 B1 | * | 3/2020 | Speece .................... | B01F 25/32 |
| 10,999,968 B1 | * | 5/2021 | Cooper .................. | A01C 21/00 |

(Continued)

FOREIGN PATENT DOCUMENTS

| | | |
|---|---|---|
| CN | 205794067 U | 12/2016 |
| CN | 208029442 U | 11/2018 |

(Continued)

OTHER PUBLICATIONS

International Search Report and Written Opinion issued in App. No. PCT/EP2023/063453, dated Aug. 24, 2023, 12 pages.

(Continued)

*Primary Examiner* — Donnell A Long
(74) *Attorney, Agent, or Firm* — DILWORTH IP, LLC

(57) ABSTRACT
A device for diluting and mixing concentrated aqueous fertilizer solutions. The device may be used to incorporate fertilizer solutions in the irrigation of a farm. The present disclosure also provides the use of the device for distributing fertilizer to a field and a method for distributing a fertilizer solution to crops using an irrigation system.

14 Claims, 2 Drawing Sheets

(56)  References Cited

U.S. PATENT DOCUMENTS

| | | | | |
|---|---|---|---|---|
| 2008/0094935 | A1* | 4/2008 | Newton | A01M 7/0092 |
| | | | | 366/132 |
| 2009/0092001 | A1* | 4/2009 | Hildreth | B01F 25/53 |
| | | | | 366/132 |
| 2012/0279912 | A1* | 11/2012 | McCurdy | B01F 23/451 |
| | | | | 285/361 |
| 2014/0037467 | A1* | 2/2014 | Raasch | B01F 25/31243 |
| | | | | 417/76 |
| 2016/0228833 | A1* | 8/2016 | Riel | A23L 33/21 |
| 2017/0361357 | A1* | 12/2017 | Raasch | B01F 25/31242 |
| 2018/0043320 | A1* | 2/2018 | Ramsay | B01F 25/43161 |
| 2019/0001290 | A1* | 1/2019 | Fletcher | B01F 35/21112 |
| 2020/0053958 | A1 | 2/2020 | Tabata | |
| 2022/0088552 | A1 | 3/2022 | Mcconville et al. | |

FOREIGN PATENT DOCUMENTS

| | | |
|---|---|---|
| CN | 210298547 U | 4/2020 |
| CN | 215352989 U | 12/2021 |

OTHER PUBLICATIONS

Office Action received for Chinese Patent Application No. 202380033249.X, mailed on Mar. 27, 2026, 5 pages (5 pages of English Translation and 3 pages of Original Document).

* cited by examiner

DEVICE FOR DILUTING AND MIXING CONCENTRATED AQUEOUS SOLUTIONS

FIELD OF THE INVENTION

The present disclosure is related to the field of fertigation, which is the distribution of fertilizers to crops with an irrigation system.

BACKGROUND OF THE INVENTION

Fertigation, i.e. the technique of providing nutrients to crops via the irrigation system, is a technique that allows a precise delivery of water-soluble nutrients that can be quickly absorbed by the crops. It may also reduce the water consumption of the farm.

Fertigation requires the farmer to prepare fertilizer solutions from concentrated liquid fertilizer products or solid fertilizer products in containers and add these solutions into the irrigation system of the farm.

Fertigation often requires the farmer to own at least two containers because some nutrient sources cannot be mixed together at high concentration: for example calcium salts, such as calcium nitrate, and phosphate salts should not be mixed together at high concentrations. Otherwise the water-insoluble salt calcium phosphate precipitates out of the solution.

Conventional fertigation systems may either pre-mix the fertilizer solutions from different tanks in a mixing tank wherein the concentration of the nutrients is so low that the risk of precipitation is minimal, or add directly the container solutions into their irrigation line. However such systems can be quite expensive and complicated to use, such that farmers are not willing to adopt fertigation.

So there is a need to provide a simpler, cheaper system to add aqueous fertilizer solutions to an irrigation system.

SUMMARY OF THE INVENTION

It was found out that it was possible to design and build a rather simple device comprising pipes, liquid distributors, static mixers, and valves, which is configured to be connected to a water source and two containers holding a fertilizer solution, and is suitable for mixing the fertilizer solutions with water from the water source to provide a diluted fertilizer solution ready to be distributed in a field via the irrigation system.

In one aspect, the present disclosure provides a device for diluting and mixing concentrated aqueous fertilizer solutions, comprising a water inlet fluidically connected to a first liquid distributor for distributing water to three outlets, wherein:

the first outlet is fluidically connected to a first pipe comprising a first inline static mixer, said first pipe further comprising a first inlet upstream from said first inline static mixer, wherein said first inlet is configured to be connected to a first container comprising a first aqueous fertilizer solution;

the second outlet is fluidically connected to a second pipe comprising a second inline static mixer, said second pipe further comprising a second inlet upstream from said second inline static mixer, wherein said second inlet is configured to be connected to a second container comprising a second aqueous fertilizer solution;

said first pipe and said second pipe being are fluidically connected to a second liquid distributor downstream from said first and second inline static mixer, said second liquid distributor further comprising a single outlet through which said second liquid distributor is fluidically connected to a third liquid distributor;

the third outlet is fluidically connected to a third pipe comprising a valve for regulating the water flow, said third pipe being fluidically connected to said third liquid distributor downstream from said valve; and;

said third liquid distributor further comprising a single outlet fluidly connected to an outlet pipe configured to be connected to a water pump, downstream of said third liquid distributor.

In another aspect, the present disclosure provides a method for distributing a fertilizer solution to a field using an irrigation system, comprising the step of:

a) providing two containers holding a fertilizer solution;

b) providing a device according to the present disclosure;

c) connecting the outlet of a container to the first inlet of the device, and the outlet of the other container to the second inlet of the device;

d) connecting the water inlet of the device to a water source;

e) connecting the outlet pipe of the device to a water pump connected to an irrigation system;

f) starting the water pump, thereby drawing in water from the water source into the first pipe, the second pipe, and optionally the third pipe, and drawing in the fertilizer solutions from the containers to the first and second pipes.

In another aspect, the present disclosure provides the use of the device according to the present disclosure or the arrangement according to the present disclosure for distributing fertilizer to a field.

BRIEF DESCRIPTION OF THE FIGURES

The following description of the figure of a specific embodiment of a system according to the present disclosure is only given by way of example and is not intended to limit the present explanation, its application or use. In the figure, identical reference numerals refer to the same or similar parts and features.

DETAILED DESCRIPTION OF THE INVENTION

Figure 1:
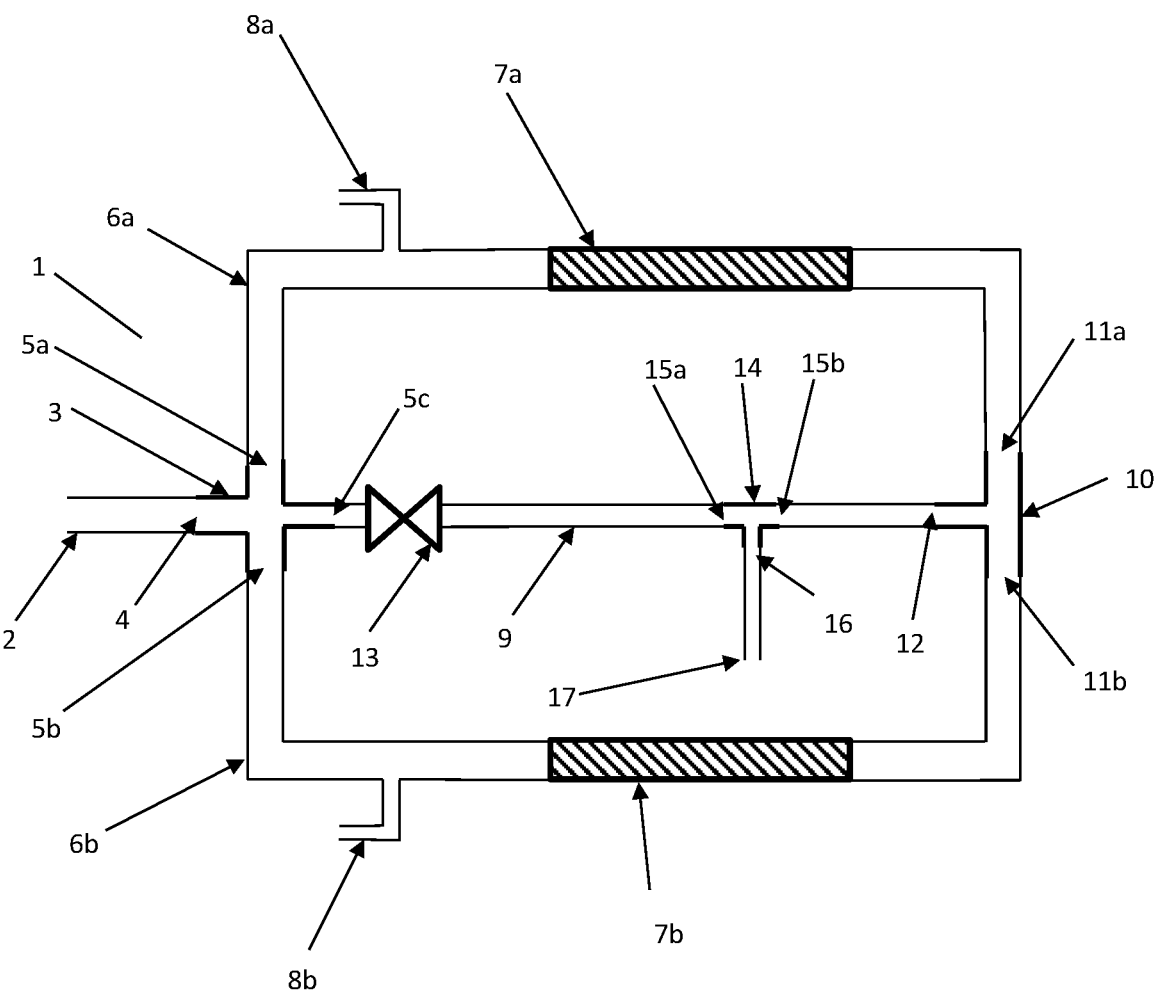
FIG. 1 represents an embodiment of a device according to the present disclosure.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

All references cited in this description are hereby deemed to be incorporated in their entirety by way of reference.

As used herein, the following terms have the following meanings:

"A", "an", and "the" as used herein refers to both singular and plural referents unless the context clearly dictates otherwise. By way of example, "a pipe" refers to one or more than one pipe.

"Comprise", "comprising", and "comprises" and "comprised of" as used herein are synonymous with "include", "including", "includes" or "contain", "containing", "contains" and are inclusive or open-ended terms that specifies the presence of what follows e.g. component and do not exclude or preclude the presence of additional, non-recited components, features, element, members, steps, known in the art or disclosed therein.

A liquid distributor as referred to herein is an element comprising one or more inlets and one or more outlets, and serves to distribute liquid coming in through the one or more inlets over the one or more outlets.

In one aspect, the present disclosure provides a device for diluting and mixing concentrated aqueous fertilizer solutions, comprising a water inlet fluidically connected to a first liquid distributor for distributing water to three outlets, wherein:

the first outlet is fluidically connected to a first pipe comprising a first inline static mixer, said first pipe further comprising a first inlet upstream from said first inline static mixer, wherein said first inlet is configured to be connected to a first container comprising a first aqueous fertilizer solution;

the second outlet is fluidically connected to a second pipe comprising a second inline static mixer, said second pipe further comprising a second inlet upstream from said second inline static mixer, wherein said second inlet is configured to be connected to a second container comprising a second aqueous fertilizer solution;

said first pipe and said second pipe being are fluidically connected to a second liquid distributor downstream from said first and second inline static mixer, said second liquid distributor further comprising a single outlet through which said second liquid distributor is fluidically connected to a third liquid distributor;

the third outlet is fluidically connected to a third pipe comprising a valve for regulating the water flow, said third pipe being fluidically connected to said third liquid distributor downstream from said valve; and;

said third liquid distributor further comprising comprises a single outlet fluidly connected to an outlet pipe configured to be connected to a water pump, downstream of said third liquid distributor.

An advantage of the device according to the present disclosure is that it can be installed on any irrigation system already present in the farm. The farmer only needs to acquire the present device and two containers suitable to hold a fertilizer solution, and he can build a working arrangement that can be connected to its irrigation system. The device comprises a water inlet configured to be connected on one end to a water source and connected on the other end to an inlet of a first liquid distributor comprising one inlet and three outlets. The water inlet is configured to be connected to the water source that the farmer conventionally uses for irrigation.

Another advantage of the present device is that it is configured to be installed upstream of the vacuum pump, i.e. between the water source and the pump. This means that a single pump is required and is used to set the entire arrangement comprising the device and two containers holding a fertilizer solution under vacuum. In conventional systems, the mixing of the water from the water source and the concentrated fertilizer solutions is done downstream of the water pump, i.e. under a pressure above 1 bar. This requires the use of one or more additional pump to increase the pressure of the fertilizers solutions before they can be added to the water from the water source.

The characteristics of the pipe, such as diameter, length, and material, may be adapted to the system of the farmer. It may be an advantage that the water inlet of the device has the same diameter than the pipe connected to its water source, so that the connection between the two pipes is easy to setup.

In one embodiment, any pipe comprised in the device may be made of a plastic, such as polyvinyl chloride (PVC) or polyethylene (PET).

The inlet pipe ending on one end with the water inlet leads the water to a first liquid distributor comprising one inlet (for the inlet pipe) and three outlets.

The first outlet of the first liquid distributor is connected to a first pipe comprising a first inlet configured to be connected to a first container comprising a first aqueous fertilizer solution and a first inline static mixer for mixing the first aqueous fertilizer solution with water from the water source, the first inlet being located upstream of the first inline static mixer. The first pipe is designed to receive water from the water source and a fertilizer solution from the first inlet. The two liquids are directed to an inline static mixer. An inline static mixer is a pipe comprising elements inside the pipe that cause turbulence in the liquid carried out in the mixer. The turbulences improve the mixing of liquids in the case that the liquid directed to the mixer comprises different sources. In operation, the first inline static mixer mixes the water coming from the water source and the fertilizer solution coming from the container connected to the first pipe to provide a diluted, homogeneous, fertilizer solution.

The second outlet of the first liquid distributor is connected to a second pipe, similar to the first pipe. The second pipe comprises a second inlet configured to be connected to a second container comprising a second aqueous fertilizer solution and a second inline static mixer for mixing the second aqueous fertilizer solution with water from the water source, the second inlet being located upstream of the second inline static mixer. In operation, the second inline static mixer mixes the water coming from the water source and the fertilizer solution coming from the container connected to the second pipe to provide a diluted fertilizer solution.

The third outlet of the first liquid distributor is connected to one end of a third pipe, the other end of the third pipe being connected to an inlet of third liquid distributor comprising two inlets and one outlet, and the third pipe comprises a valve for regulating the water flow therein, the valve being located between the first liquid distributor and the third liquid distributor. The third pipe allows some of the water from the water source to bypass the first and second pipe of the device. Depending on the water flow generated by the water pump and the desired dilution of the fertilizer solutions, it may be an advantage that some of the water flow from the water source does not go through the first or second pipe to dilute a fertilizer solution. The third pipe comprises a valve which regulates the amount of water going from the inlet pipe to the third pipe.

The first pipe is connected, downstream of the first static inline mixer, to a first inlet of a second liquid distributor comprising two inlets and one outlet, and the second pipe is connected, downstream of the second static inline mixer, to the second inlet of the second liquid distributor. Irrigation systems usually use a two-tank or two-container system. This is required due to the wide range of properties of fertilizer solutions to be used in fertigation. Some fertilizer solutions may be incompatible at high concentrations, due to the risk of salt precipitation. For example, a concentrated aqueous solution containing calcium ions, such as calcium nitrate, should not be mixed with a concentrate solutions of phosphate ions, and/or sulphate ions, because there is a high risk that calcium phosphate and/or calcium sulphate, salts with a very low water-solubility, may be formed and precipitate out of the solution. Salt precipitation is highly undesirable because it reduces the nutrient content of the solution distributed to the field, and it may lead to blockages of parts of the irrigation system, such as pipes, drippers, sprinklers, or nozzles. Additionally, fertilizer solutions may have a wide range of pH, and mixing a concentrated acidic solution with a concentrated basic solution also often lead to salt precipitation.

However, once the concentrated solutions have been diluted in the first and second pipe, the risk of salt precipitation is much lower and the diluted solutions may be mixed together, so the device comprises a third liquid distributor wherein the first and second pipes are joined in a single pipe and stream.

The outlet of the second liquid distributor which receives the liquid streams from the first and second pipe is connected to an inlet of the third liquid distributor, such that the stream comprising the two fertilizer solutions is optionally further mixed with the water stream coming from the water source if the valve of the third pipe is at least partially open.

The third liquid distributor comprises an outlet connected to an outlet pipe, which is configured to be connected to a water pump, downstream of the third liquid distributor. In operation, the water pump creates a vacuum inside the pipes of the device such that water from the water source and the fertilizer solutions from the two containers is sucked into the device, and all the liquid streams mix with one another as explained above.

All the connections, and liquid distributors of the device should comprise as few leaks as possible to ensure that the under-pressure caused by the water pump is as low as possible.

In one embodiment, the device comprises a particle filter between the second liquid distributor and the third liquid distributor for removing any water-insoluble particle comprised in the liquid stream. Although the risk of salt precipitation is very low after the second liquid distributor since the fertilizer solutions have been diluted, it may be an advantage for the pipe between the second liquid distributor and the third liquid distributor to comprise a particle filter, such that any water-insoluble particle due to precipitation or other causes, such as impurity in the fertilizer solutions, is captured by the filter and does not reach the irrigation system.

In one embodiment, the device comprises 1, 2, 3, 4 or 5 particle filters between the second liquid distributor and the third liquid distributor for removing any water-insoluble particle comprised in the liquid stream.

In one embodiment, the inlet of the first pipe comprises a valve for regulating the liquid flow from the first container to the first pipe.

In one embodiment, the inlet of the second pipe comprises a valve for regulating the liquid flow from the second container to the second pipe.

It may be an advantage for the farmer to be able to control the flow of fertilizer solution into the first and second pipe, and a valve comprised in the inlet of either pipe is able to perform such task. Controlling the flow of the fertilizer solutions allows the farmer to control the final concentration in nutrients of the solution being distributed in the field to the crops. To avoid the waste of fertilizer or water, or under-fertilizing the crops, the nutrient concentration of the solution leaving in the outlet pipe should be adapted according to standard fertigation knowledge.

In one embodiment, the inlet of the first pipe comprises a flow meter for monitoring the liquid flow from the container to the first pipe.

In one embodiment, the inlet of the second pipe comprises a flow meter for monitoring the liquid flow from the container to the second pipe.

A flow meter may be used to monitor the liquid flow between the container holding a concentrated fertilizer solution and the present device, such that the farmer may know the amount of fertilizer solution that is being drawn into the device.

In one embodiment, the outlet pipe comprises a sensor, located downstream of the third liquid distributor, for measuring the electroconductivity of the liquid therein. The electroconductivity or EC of a fertilizer solution may be a good indication of the nutrient content of the solution, and it may be used by farmers to check that their solution has the desired composition.

In one embodiment, the device comprises means for increasing the residence time of the liquid stream between the second liquid distributor and the third liquid distributor. When the two streams from the first and second pipe are joined at the second liquid distributor, the stream coming out of the second liquid distributor is not an homogeneous solution. It may be an advantage to increase the residence time of the liquid solution between the second liquid distributor and the third liquid distributor to increase the homogeneity of the solution. The means may be a longer pipe, or a pipe comprising turns and/or U-turns, i.e. 180° turns. The pipe may also comprise one or more liquid distributors to split the stream in two or more sub-streams, that are re-joined together before reaching the third liquid distributor.

In another aspect, the present disclosure provides an arrangement comprising two containers for storing a fertilizer solution and a device according to the present disclosure, wherein the outlet of one container is connected to the first inlet of the first pipe and the outlet of the other container is connected to the second inlet of the second pipe. This arrangement comprises the device as described above, and two containers for storing a fertilizer solution. The two containers are connected to the device via the first inlet and the second inlet of the device.

The two containers may hold different fertilizer solutions. They may hold different fertilizer solutions that contain one or more nutrient present in both solutions. For example, one container may hold an aqueous solution of calcium nitrate, which contains nitrogen as nitrate ions, and the other container may hold ammonium phosphate, which contains nitrogen as ammonium ions.

The fertilizer solutions hold in the containers may be obtained by diluting a concentrated fertilizer liquid product, or by dissolving solid fertilizer products into a liquid composition comprising water.

A fertilizer solution hold in a container may contain one or more nutrients required by crops. The nutrients are divided in three categories: the primary nutrients (nitrogen, phosphorus and potassium), the secondary nutrients (calcium, magnesium and sulfur), and the micronutrients (boron, iron, manganese, molybdenum, copper, and zinc).

In one embodiment, a container comprises a valve for regulating the liquid flow in the connection between the container and the device according to the present disclosure. It may be an advantage for the farmer to be able to regulate the flow of fertilizer solution from the container to the device, and this can be achieved by a valve present on the pipe comprise in the container that is configured to be connected to the device according to the present disclosure.

In one embodiment, the water inlet is connected to a water source, and the outlet pipe is connected to a water pump.

In another aspect, the present disclosure provides a method for distributing a fertilizer solution to a field using an irrigation system, comprising the step of:

a) providing two containers holding a fertilizer solution;

b) providing a device according to the present disclosure;

c) connecting the outlet of a container to the first inlet of the device, and the outlet of the other container to the second inlet of the device;

d) connecting the water inlet of the device to a water source;

e) connecting the outlet pipe of the device to a water pump connected to an irrigation system;

f) starting the water pump, thereby drawing in water from the water source into the first pipe, the second pipe, and optionally the third pipe, and drawing in the fertilizer solutions from the containers to the first and second pipes.

The method according to the present disclosure requires the provision of two containers holding a fertilizer solution that needs to be distributed to a field via the irrigation system of the farm. As discussed above, the containers may hold fertilizer solutions with different chemical compositions, and they may be prepared by different methods, such as diluting a concentrated liquid fertilize product, or dissolving a solid fertilizer product in a liquid composition comprising water.

A device according to the present disclosure is provided, and the outlets of the containers are connected to the first and second inlets of the device.

The water inlet of the device is connected to a water source. The water source may be a water body, such as a lake, a pond or the water contained in a well.

The outlet pipe of the device is connected to a water pump. The water pump should be able to generate a vacuum strong enough to cause the water from the water source and the fertilizer solutions to be sucked into the device.

The water pump is then started, thereby drawing in water from the water source into the first pipe, the second pipe, and optionally the third pipe, and drawing in the fertilizer solutions from the containers to the first and second pipes.

The steps a) to e) can be performed in any order, with the proviso that step c) is performed after steps a) and b) since step c) requires two containers (provided in step a)), and the device according to the present disclosure (provided in step b)).

The containers provided in step a) may also be called tanks. Within the field, these tanks are often referred to as tank A and B.

In another aspect, the present disclosure provides the use of the device according to the present disclosure or the arrangement according to the present disclosure for distributing fertilizer to a field.

FIG. 1 represents an embodiment of a device according to the present disclosure. The device 1 comprises a water inlet 2 configured to be connected on one end to a water source, and connected on the other end to an inlet 4 of a first liquid distributor 3 comprising one inlet 4 and three outlets 5a, 5b, and 5c. The first outlet 5a of the first liquid distributor 3 is connected to a first pipe 6a comprising a first inlet 8a configured to be connected to a first container comprising a first aqueous fertilizer solution and a first inline static mixer 7a for mixing the first aqueous fertilizer solution with water from the water source, the first inlet 8a being located upstream of the first inline static mixer 7a. The second outlet 5b of the first liquid distributor 3 is connected to a second pipe 6b comprising a second inlet 8b configured to be connected to a second container comprising a second aqueous fertilizer solution and a second inline static mixer 7b for mixing the second aqueous fertilizer solution with water from the water source, the second inlet 8b being located upstream of the second inline static mixer 7b.

The third outlet 5c of the first liquid distributor 3 is connected to one end of a third pipe 9, the other end of the third pipe 9 being connected to an inlet 15a of third liquid distributor 14 comprising two inlets 15a and 15b, and one outlet 16.

The first pipe 6a is connected, downstream of the first static inline mixer 7a, to a first inlet 11a of a second liquid distributor 10 comprising two inlets 11a and 11b, and one outlet 12. The second pipe 6b is connected, downstream of the second static inline mixer 7b, to the second inlet 11b of the second liquid distributor 10. The outlet 12 of the second liquid distributor 10 is connected to an inlet 15b of the third liquid distributor 14.

The third pipe 9 comprises a valve 13 for regulating the water flow therein, the valve being located between the first liquid distributor 3 and the third liquid distributor 14. An outlet pipe 17 is connected to the outlet 16 of the third liquid distributor 14 and configured to be connected to a water pump, downstream of the third liquid distributor 14.

Figure 2:
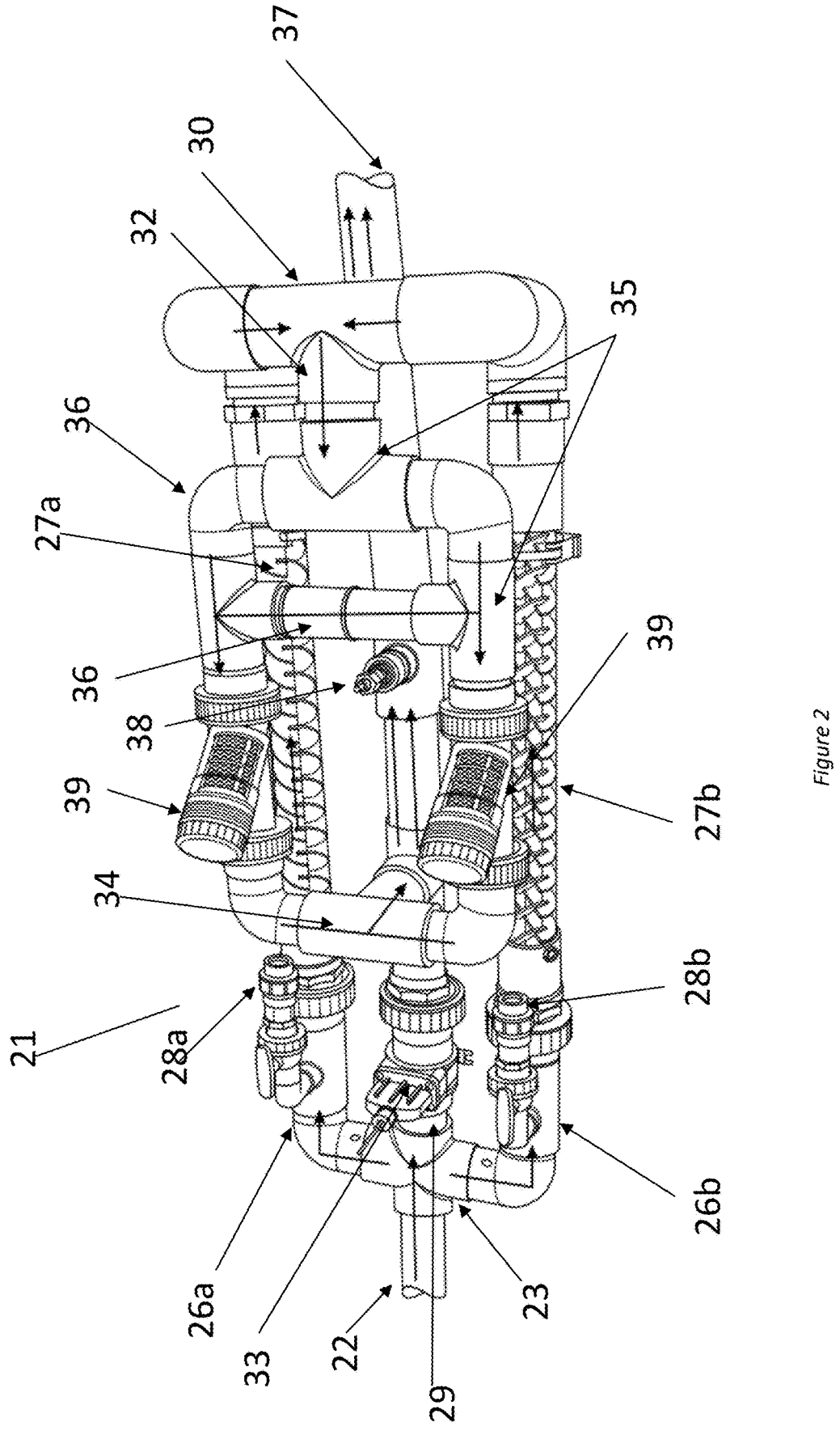
FIG. 2 represents another embodiment of a device according to the present disclosure.

FIG. 2 represents another embodiment of a device according to the present disclosure. The device 21 of FIG. 2 comprises all the features of the device of FIG. 1: a water inlet 22; a first liquid distributor 23 comprising one inlet and three outlets; a first pipe 26a, a first inlet 28a, a first static mixer 27a; a second pipe 26b, a second inlet 28b, a second static mixer 27b; a second liquid distributor 30 comprising two inlets, and one outlet 32; a third pipe 29 comprising a valve 33; a third liquid distributor 34 comprising two inlets, and one outlet; and an outlet pipe 37.

In addition, the section between the second liquid distributor 30 and the third liquid distributor 34 is not a single straight pipe, but comprises several liquid distributors 35 and pipes 36 to increase the residence time of the liquid before reaching the third liquid distributor 34. This section also comprises two filters 39 for removing water-insoluble particles from the liquid stream. This section is located above the first and second pipes 26a, 26b, such that the length of the device is reduced and occupies less space on the ground.

The invention claimed is:

1. A device for diluting and mixing concentrated aqueous fertilizer solutions, comprising a water inlet fluidically connected to a first liquid distributor for distributing water to three outlets, wherein:

a first outlet of the three outlets is fluidically connected to a first pipe comprising a first inline static mixer, said first pipe further comprising a first inlet upstream from said first inline static mixer, wherein said first inlet is configured to be connected to a first container comprising a first aqueous fertilizer solution;

a second outlet of the three outlets is fluidically connected to a second pipe comprising a second inline static mixer, said second pipe further comprising a second inlet upstream from said second inline static mixer, wherein said second inlet is configured to be connected to a second container comprising a second aqueous fertilizer solution;

said first pipe and said second pipe are fluidically connected to a second liquid distributor downstream from said first and second inline static mixer, said second liquid distributor further comprising a single outlet through which said second liquid distributor is fluidically connected to a third liquid distributor;

a third outlet of the three outlets is fluidically connected to a third pipe comprising a valve for regulating water flow, said third pipe being fluidically connected to said third liquid distributor downstream from said valve; and said third liquid distributor comprises a single outlet fluidly connected to an outlet pipe configured to be connected to a water pump, downstream of said third liquid distributor.

2. The device according to claim 1, wherein the device comprises a particle filter between the second liquid distributor and the third liquid distributor for removing any water-insoluble particle comprised in a liquid stream.

3. The device according to claim 2, wherein the first inlet of the first pipe comprises a valve for regulating the liquid flow from the first container to the first pipe.

4. The device according to claim 3, wherein the second inlet of the second pipe comprises a valve for regulating the liquid flow from the second container to the second pipe.

5. The device according to claim 4, wherein the outlet pipe comprises a sensor, located downstream of the third liquid distributor, for measuring electroconductivity of the liquid therein.

6. The device according to claim 5, wherein the device comprises means for increasing a residence time of a liquid stream between the second liquid distributor and the third liquid distributor.

7. An arrangement comprising two containers for storing a fertilizer solution and the device according to claim 1, wherein the outlet of a first one of the two containers is connected to the first inlet of the first pipe and the outlet of a second one of the two containers is connected to the second inlet of the second pipe.

8. The arrangement according to claim 7, wherein the water inlet is connected to a water source, and the outlet pipe is connected to a water pump.

9. A method for distributing a fertilizer solution to crops using an irrigation system, comprising steps of:

a) providing two containers holding a fertilizer solution;

b) providing a device according to claim 1;

c) connecting the outlet of a first one of the two containers to the first inlet of the device, and the outlet of a second one of the two containers to the second inlet of the device;

d) connecting the water inlet of the device to a water source;

e) connecting the outlet pipe of the device to a water pump connected to an irrigation system;

f) starting the water pump, thereby drawing in water from the water source into the first pipe, the second pipe, and optionally the third pipe, and drawing in the fertilizer solutions from the containers to the first and second pipes.

10. The method of claim 9, wherein the two containers each hold a different fertilizer solution, wherein the first one of the two containers holds an acidic fertilizer solution, and the second one of the two containers holds a basic fertilizer solution.

11. The device according to claim 1, wherein the first inlet of the first pipe comprises a valve for regulating the liquid flow from the first container to the first pipe.

12. The device according to claim 1, wherein the second inlet of the second pipe comprises a valve for regulating the liquid flow from the second container to the second pipe.

13. The device according to claim 1, wherein the outlet pipe comprises a sensor, located downstream of the third liquid distributor, for measuring electroconductivity of the liquid therein.

14. The device according to claim 1, wherein the device comprises means for increasing a residence time of a liquid stream between the second liquid distributor and the third liquid distributor.

* * * * *